United States Patent [19]

Spahn

[11] Patent Number: 4,835,974
[45] Date of Patent: Jun. 6, 1989

[54] PROCESS FOR THE REMOVAL OF IMPURITIES FROM EXHAUST GASES

[75] Inventor: Walter Spahn, Frankfurt am Main, Fed. Rep. of Germany

[73] Assignee: Messer, Griesheim GMBH, Fed. Rep. of Germany

[21] Appl. No.: 145,607

[22] Filed: Jan. 19, 1988

[30] Foreign Application Priority Data

Jan. 21, 1987 [DE] Fed. Rep. of Germany ....... 3701544

[51] Int. Cl.$^4$ ................................................ F25J 5/00
[52] U.S. Cl. ...................................... 62/12; 110/216; 422/244
[58] Field of Search ............... 62/9, 11, 12, 15, 36, 62/40; 165/61; 110/203, 216; 422/244

[56] References Cited

U.S. PATENT DOCUMENTS

| | | | |
|---|---|---|---|
| 3,418,820 | 12/1968 | Swearihgen | 62/12 |
| 4,169,133 | 9/1979 | Staege | 62/12 X |
| 4,252,772 | 2/1981 | Way | 62/12 X |
| 4,609,388 | 9/1986 | Adler et al. | 62/12 |

*Primary Examiner*—Steven E. Warner
*Attorney, Agent, or Firm*—Connolly & Hutz

[57] ABSTRACT

The removal of impurities from exhaust gases takes place by cooling the exhaust gas by means of a circulation gas and condensing out of the impurities in two groups of reversible heat exchangers. Each group consists of two precoolers and one low temperature cooler. While the impurities condense out in one group, they are thawed in the other group. In order to simplify the control, only one precooler is used in each group, which is charged with two inside gases, namely, the exhaust gas and the circulation gas. Only two simple control systems which can be easily program-controlled are then required for the purification process. In addition, the temperature increase of the circulation gas in the circulation gas blower can be utilized for heating up purposes in the group to be thawed.

1 Claim, 3 Drawing Sheets

PROCESS FOR THE REMOVAL OF IMPURITIES FROM EXHAUST GASES

BACKGROUND OF THE INVENTION

It is known that a component can be separated from a gas mixture by cooling the gas mixture so that the related component is frozen out. German Preliminary Published Application 34 22 417, for example, shows such a process. This process principle is applied in industrial practice, for example, to freeze out and recover solvent vapors from exhaust gases. In an installation of this type, liquid nitrogen is used as a cooling source for cooling a circulation gas to the desired low temperature. The impurities are condensed out in two groups of reversible heat exchangers which are charged with the circulation gas. Each group consists of two precoolers and one low temperature cooler. While the impurities are condensed out in one group, they are thawed in the other group.

With this known process, solvent vapors can be effectively removed from exhaust gases but the control of the process is difficult and expensive.

SUMMARY OF THE INVENTION

The invention is based on improving the known process in such a way that the control becomes extremely simple. Moreover, the employed energy, in particular, for the circulation blower, is to be more efficiently utilized.

In accordance with the invention, the process operates only with one precooler in each group of heat exchangers, which precooler is, however, charged with two inside gases, namely the circulation gas and the exhaust gas. As a result, a problem-free control of the process is surprisingly obtained. Two simple control systems are required. With the exception of the control valve for the liquid nitrogen, only solenoid valves with the settings on/off are needed. The process according to the invention can, therefore, be easily operated program-controlled.

THE DRAWINGS

DETAILED DESCRIPTION

Figure 1:
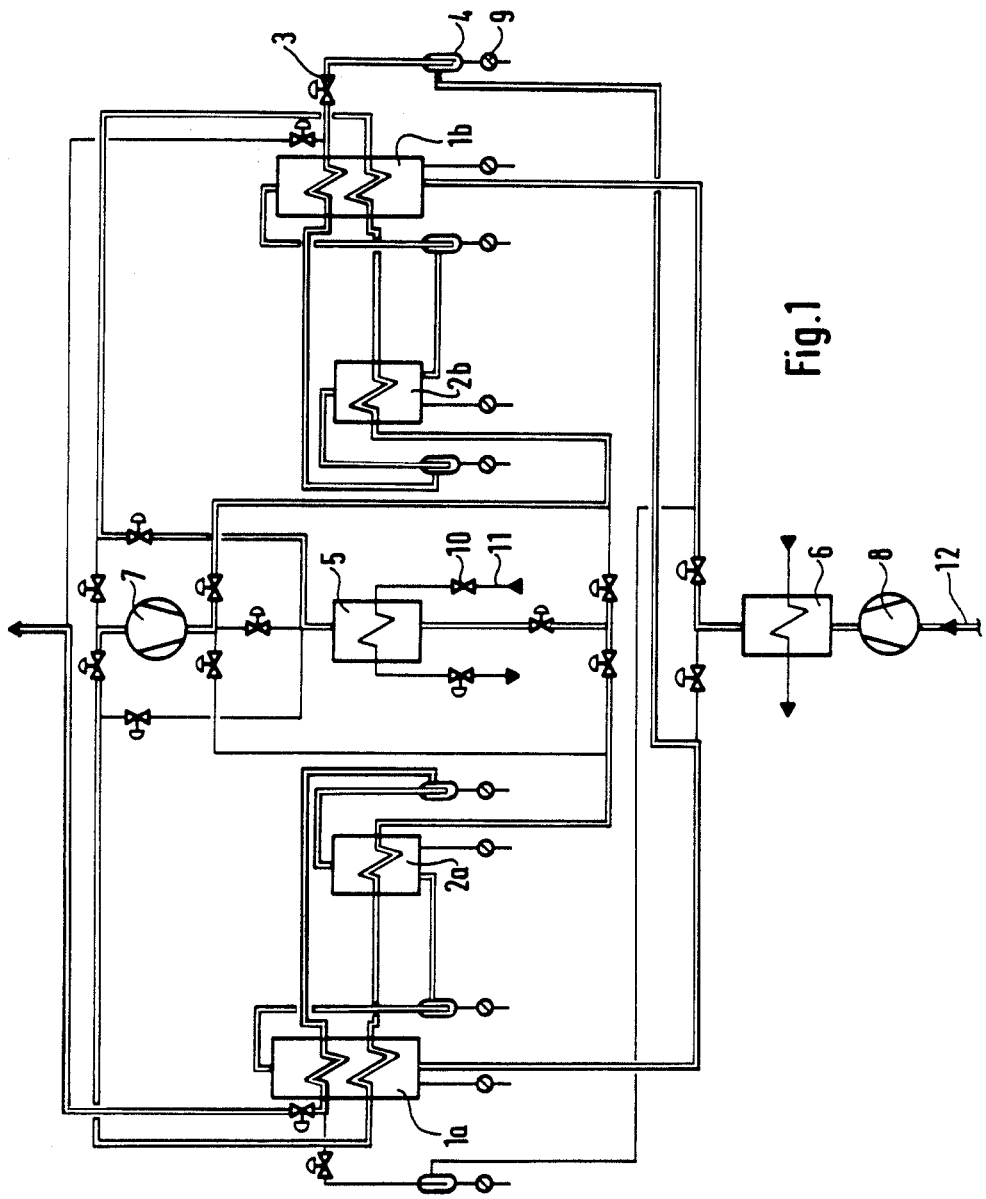
FIG. 1 shows an operation state in which one group of heat exchangers condenses and thawing takes place in the other group.
Figure 2:
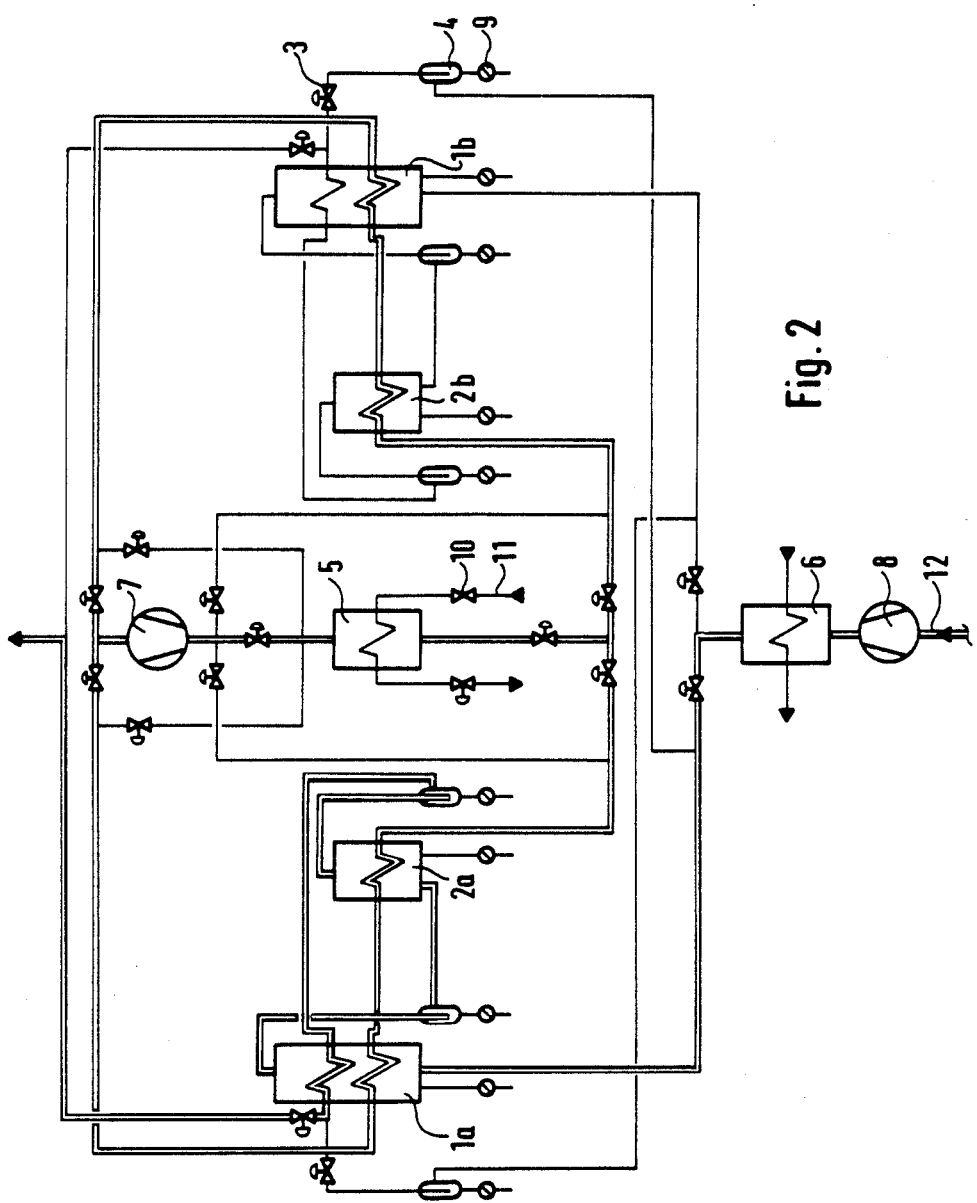
FIG. 2 shows the next operation state in which one group condenses and precooling takes place in the other group.
Figure 3:
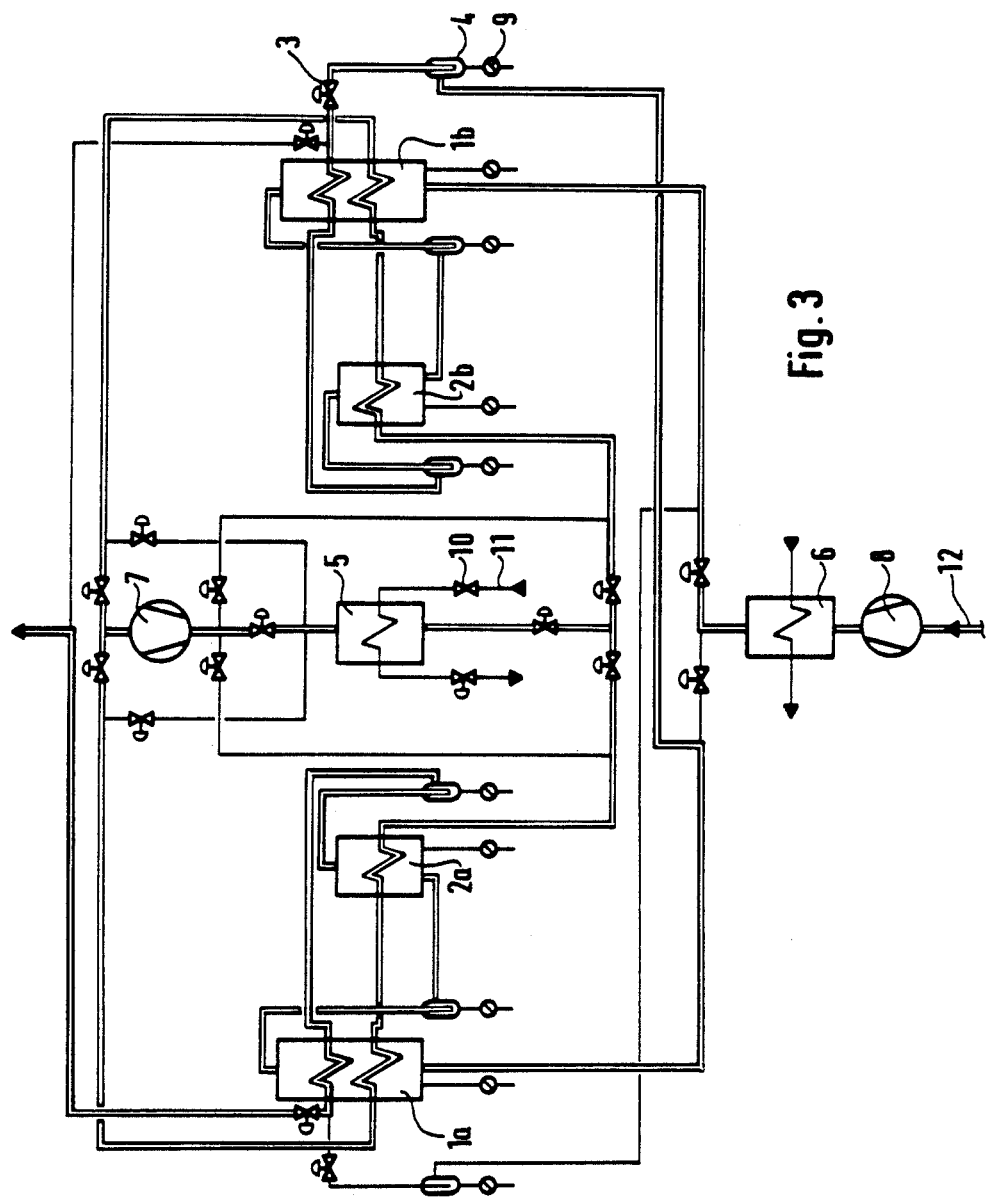
FIG. 3 shows the subsequent operation state in which one group continues to condense while in the other group the crude gas is cooled off.

The installation shown in FIGS. 1 to 3 for conducting the process according to the invention essentially consists of two groups of heat exchangers, namely, a first group consisting of the precooler 1a and the low temperature cooler 2a as well as a second group consisting of the precooler 1b and the low temperature cooler 2b. The low temperature required to condense out the impurities is provided by the liquid nitrogen which enters the installation through the line 11 whereby its amount is adjusted to the appropriate need by means of the nitrogen control valve 10. A circulation gas is cooled off in the circulation cooler 5 by the evaporating liquid nitrogen.

This circulation gas are compensated for by the circulation blower 7. The gas to be treated enters the installation through the line 12, is brought to the required process pressure by means of the exhaust gas blower 8 and precooled in the exhaust gas cooler 6 charged with cooling water. For simplicity's sake, the other parts of the lines of the installation have not been provided with reference numbers which also applies for the solenoid valves 3, the condensate separator 4 and the outlet valves 9 which were provided only once by way of example with reference numbers.

An essential advantage of the process according to the invention is that, with the exception of the nitrogen control valve 10, all other valves are solenoid valves 3 which are exclusively operated with the settings on/off so that the process of the invention can be easily operated program-controlled.

In FIGS. 1 to 3, the lines charged with exhaust gas are each time represented by thick, black lines whereas the lines charged with circulation gas are represented by two thin parallel lines.

The two groups of heat exchangers, as known per se, are operated reversibly. While in one group the impurities condense out, they are thawed in the other group. The individual phases of the process according to the invention are described below.

In the operation phase represented in FIG. 1, the impurities are condensed out in the group of heat exchangers consisting of the precooler 1a and the low temperature cooler 2a. In the group of heat exchangers consisting of the precooler 1b and the low temperature cooler 2b, the condensed out impurities are thawed. The exhaust gas entering the installation through the line 12 and the exhaust gas blower 8 is precooled to about 20° C. in the exhaust gas cooler 6. It then flows as outside gas through the precooler 1b and the low temperature cooler 2b. The previously condensed impurities are thawed in this group of heat exchangers by the hot exhaust gas. After leaving the low temperature cooler 2b, the exhaust gas, as inside gas, flows again through the precooler 1b and then, in already precooled state, into the other group of heat exchangers. This group consists of the precooler 1a and the low temperature cooler 2a. The exhaust gas first flows through the two heat exchangers as outside gas and finally through the precooler 1a once again as inside gas where it releases its low temperature to the exhaust gas flowing through the precooler 1a as outside gas. While the exhaust gas, as outside gas, flows through the precooler 1a and the low temperature cooler 2a, it cools off so severely that the impurities condense out. After flowing again through the precooler 1a as inside gas, it can, therefore, be released into the atmosphere in purified form.

The circulation gas is heated corresponding to its pressure increase by 20° to 30° C. in the circulation blower. From there, the circulation gas flows as inside gas through the low temperature cooler 2b and the precooler 1b so that it contributes to a rapid thawing of this group of heat exchangers. The heat of compression of the circulation blower 7 is, therefore, optimally utilized. The circulation gas in already cooled off state then arrives in the circulation cooler 5 where is it cooled off to the desired low temperature by evaporating liquid nitrogen. The circulation gas then flows through the low temperature cooler 2a and the precooler 1a and returns to the circulation blower 7. As a result of the low temperature of the circulation gas in the low temperature cooler 2a and the precooler 1a, the impurities condense there out from the exhaust gas.

FIG. 2 shows the next operation state which begins as soon as the precooler 1b and the low temperature cooler 2b have completely thawed. This group of heat exchangers is then no longer charged with the exhaust gas which flows directly through the group of heat exchangers consisting of the precooler 1a and the low temperature cooler 2a exactly as in FIG. 1. In this operation phase, the entire circulation gas from the circulation gas blower 7 is directly cooled off in the circulation cooler 5. A part of the circulation gas then flows without counter current through the low temperature cooler 2b and the precooler 1b so that this group of heat exchangers is being precooled. The other partial amount of the circulation gas, as in FIG. 1, flows through the low temperature cooler 2a and the precooler 1a. Both partial amounts of the circulation gas finally arrive again together in the circulation gas blower 7.

FIG. 3 shows the subsequent operation phase. Exactly as in FIG. 2, the circulation gas is conducted through the installation. As soon as the precooler 1b and the low temperature cooler 2b have been sufficiently precooled, the exhaust gas is then again conducted through this group of heat exchangers and, to be sure, exactly as in FIG. 1 so that it continues to cool off, but arrives first again, as in FIGS. 1 and 2 in the group of heat exchangers consisting of the precooler 1a and the low temperature cooler 2a where the impurities are condensed out. Not until the precooler 1b and the low temperature cooler 2b have been cooled off by the circulation gas to such an extent that the impurities from the exhaust gas condense out, the entire installation is reversed. The same method of operation as in FIG. 1 obviously results but with the difference that the condensed out impurities are thawed in the precooler 1a and low temperature cooler 2b and precooler 1b.

Only two simple control systems are needed for the operation of the installation. A control of an amount is only required at the nitrogen control valve 10. All operation phases can be adjusted by a simple opening or closing of the solenoid valves 3 so that the installation can be easily operated program-controlled. Another advantage of the process according to the invention is that the heat of compression of the circulation blower 7 can be directly utilized so that the use of outside energy for thawing the condensed out impurities is not necessary.

What is claimed is:

1. In a process for the removal of impurities from exhaust gases by cooling the exhaust gas and a resulting condensing out of the impurities in two groups of reversible heat exchangers, whereby the low temperature is supplied by a gaseous cooling agent circulated with a circulation blower and the condensed out impurities after each reversal of the heat exchanger groups are thawed by utilizing the heat content of the crude gas, the improvement being in that the process is conducted in heat exchanger groups each of which consists only of a precooler and a low temperature cooler and after reversal of the operation takes place in three phases, in the first phase which is a thawing phase the crude gas enters as an outside gas and successively flows through the appropriate precooler and low temperature cooler after which the crude gas which is an inside gas again flows through the precooler and is supplied to the other heat exchanger group for the condensing out of the impurities, at the same time a hot cooling agent is supplied from the circulation gas blower as an inside gas and successively flows through the appropriate low temperature cooler and precooler before the cooling agent is cooled off and supplied as inside gas to the second heat exchanger group, after which in a second phase which is a precooling phase only a partial flow of the cooled off cooling agent as an inside gas flows through the appropriate low temperature cooler and precooler while the other partial flow of the cooling agent and the crude gas are directly supplied to the other heat exchanger group, after which in a third phase which is a cooling phase the appropriate heat exchanger group is charged with the cooling agent depending on the process method in the second phase and with the crude gas depending on the process method in the first phase.

* * * * *